H. S. DICKINSON.
AGRICULTURAL IMPLEMENT.
APPLICATION FILED MAY 25, 1914.
1,233,760.
Patented July 17, 1917.
2 SHEETS—SHEET 1.
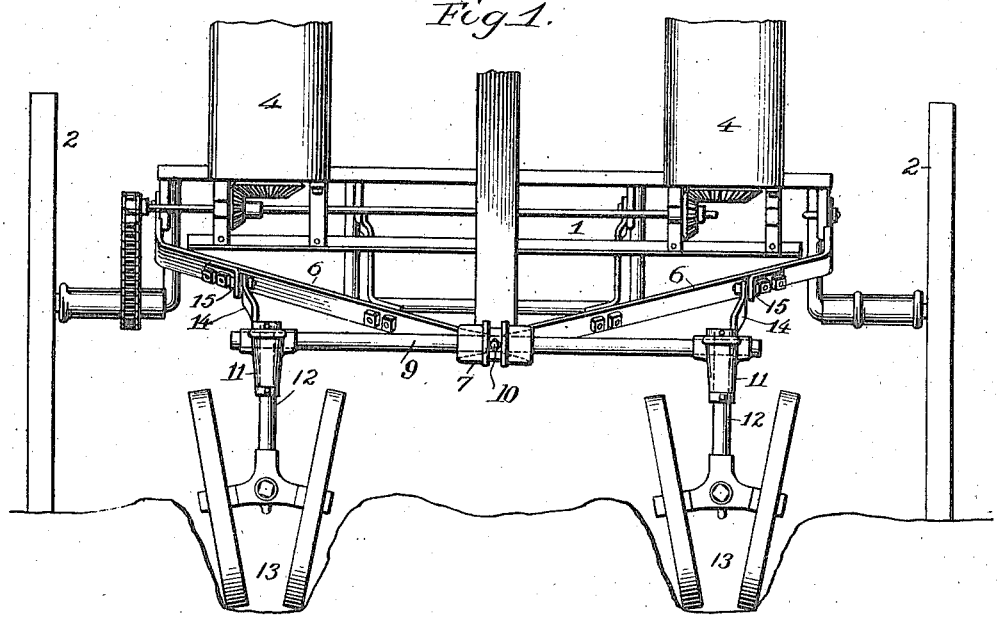
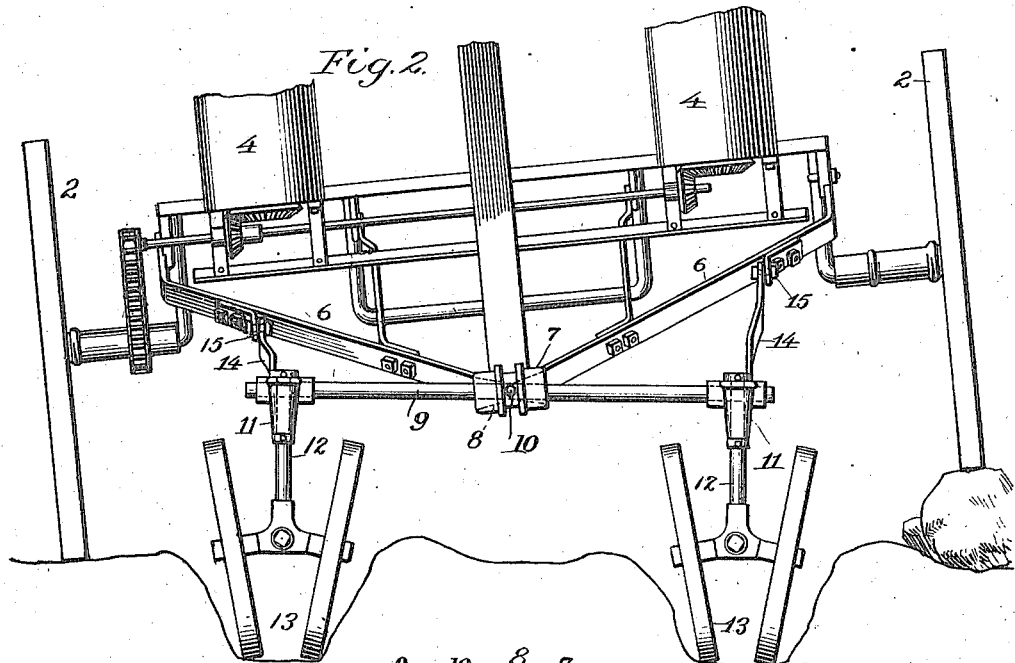

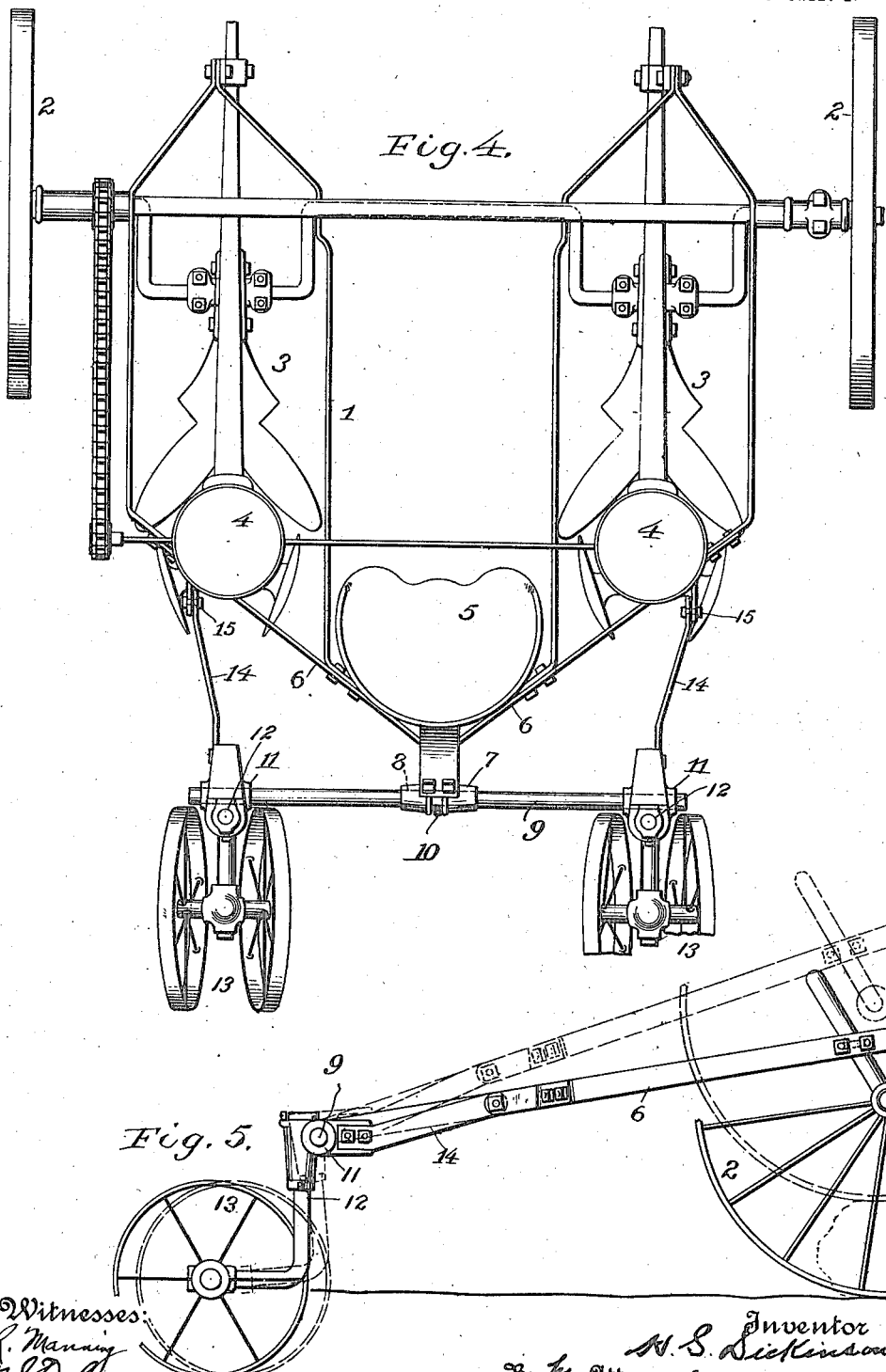

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

AGRICULTURAL IMPLEMENT.

1,233,760.   Specification of Letters Patent.   Patented July 17, 1917.

Application filed May 25, 1914.   Serial No. 840,814.

*To all whom it may concern:*

Be it known that I, HARRY S. DICKINSON, a citizen of the United States, residing at Moline, in the county of Rock Island and State of Illinois, have invented certain new and useful Improvements in Agricultural Implements, of which the following is a specification, reference being had therein to the accompanying drawing.

This invention relates to agricultural implements, and has reference more particularly to seed planting mechanism adapted to plant two rows at one operation. Machines of this type commonly comprise a wheeled frame provided with two furrow openers, two seed discharging mechanisms, and suitable covering devices for the deposited seed, commonly in the form of press or covering wheels, which are arranged to track in the furrow in rear of the deposited seed, and acting to press the soil down on the deposited seed.

The main object of the invention is to provide for a uniform distribution of the weight of the machine frame and driver, on the press wheels, without regard to unevenness in the surface of the ground over which the machine travels, so that although the machine frame may assume inclined positions, higher at one side than the other, in passing over obstructions or uneven surfaces, the press wheels will nevertheless act with uniformity and regularity in performing their function.

A further object of the invention is to insure a proper distribution of the weight of the machine frame and driver, and a consequent uniform action of the press wheels, in cases where one furrow is planted deeper than the other.

With these and other objects in view, my invention consists in connecting the press or covering wheels to a transverse balance bar, which is pivotally connected between its ends with the frame of the machine on a fore and aft axis, so as to give support to the frame at this point, the result being that the frame and press wheels may assume different angular positions relatively to each other, in which relations the weight of the frame will always be applied at the point of its connection with the balance bar, and will be uniformly and evenly distributed between the two covering devices carried by the balance bar.

In the accompanying drawings:

Figure 1 is a rear elevation of a seeding machine having my invention applied thereto;

Fig. 2 is a similar view showing how the weight of the frame is distributed between the covering devices when the former assumes an inclined position in passing over uneven surfaces;

Fig. 3 is a transverse sectional elevation, on an enlarged scale, showing the connection of the balance bar with the machine frame;

Fig. 4 is a top plan view of the machine; and

Fig. 5 is a side elevation of the rear portion of the machine, with certain parts omitted and showing the relative position of the parts when the machine is level and when it is inclined.

Referring to the drawings:

1 represents a rigid frame supported at its front by two ground wheels 2, 2, and equipped with two furrow opening devices 3, 3, two seed discharging mechanisms 4, 4, in rear of the furrow opening devices, and a driver's seat 5, the latter being sustained at the rear end of the frame at the center of the same.

The rear end of the frame diverges forwardly in the form of inclined frame bars 6, 6, to the rear extremities of which is firmly connected a horizontal transverse bearing sleeve 7, having a horizontal transverse bearing opening 8 extending therethrough, the ends of which opening are flared or elongated in a vertical direction as at 8ª for the purpose presently to be described. A horizontal transverse balance bar 9 is pivotally mounted in the bearing opening 8, by means of a fore and aft extending pivot pin 10 which is passed through the bearing sleeve and the bar, the result being that the bar is capable of a limited rocking motion relatively to the frame on a longitudinal horizontal axis, the flared ends 8ª of the bearing opening permitting such movement of the bar in the sleeve. Bearing blocks 11, 11, are mounted loosely on the opposite ends respectively of the balance bar, which blocks are provided with upright bearing openings in which the upper ends of vertical stems 12, 12 are respectively mounted. On the lower end of each stem, a pair of press wheels 13 is mounted in such position relatively to the seed planting mechanism that the wheels will track in rear of the seed planting mechanism as usual. Straps 14, 14 are fixedly connected at their rear ends to the bearing blocks and extend forwardly therefrom and have their forward ends pivoted to the inclined bars 6, 6 respectively of the frame, on horizontal transverse pivot pins 15, 15.

As a result of the construction described, the rear end of the frame is supported conjointly by the two pairs of press wheels through the medium of the balance bar 9, which receives the weight of the frame at the point of its pivotal connection with the same. By reason of the fact that a relative motion of the frame and balance bar is permitted in this manner, the two may assume different angular positions relatively to each other as shown for instance in Fig. 2. In this case the frame is in an inclined position higher at one side than at the other side, caused by the wheel on the high side passing over an obstruction. The balance bar however is in a level, truly horizontal position, and receiving the weight at its point of pivotal connection with the frame, the weight is evenly distributed between the two pairs of press wheels carried by the bar, so that the press wheels, notwithstanding the abnormal inclined position of the frame, will act with uniformity in performing their functions. The same relative angular movements of the parts will take place, but in reverse direction, in the event of the planting of one furrow deeper than the other. In such a case the balance bar will assume an inclined position, but the frame will be level, the weight of the frame however, being applied at the point of pivotal connection of the frame with the balance bar, the weight will be evenly distributed as before, between the two pairs of press wheels, and they will as before act with uniformity in performing their functions.

While in the accompanying drawings I have shown my invention as embodied in and applied to a two-row lister seeder, it is manifest that the invention is applicable to machines of other types and other constructions, provided its operation is substantially as above described; and it will be understood that the construction may be variously modified and changed by the skilled mechanic without departing from the limits of the invention. Further, it will be understood that the invention is not limited to any particular form or construction of the parts except in so far as such limitations are specified in the claims.

Having thus described my invention, what I claim is:

1. In combination with a frame provided with wheels supporting the same, a transversely extending balance bar pivotally connected between its ends on a fore and aft axis to said frame in rear of the supporting wheels, supporting devices carried by the balance bar on opposite sides of its pivotal axis and adapted to travel on the ground and support the rear portion of said frame, and connecting devices pivoted at their forward ends to the frame and operatively connected at their rear ends with the balance bar in such manner that said rear ends of the connecting devices and the balance bar may move relatively to each other.

2. In combination with a frame provided with wheels supporting the same, a transverse balance bar pivotally connected between its ends to said frame in rear of the supporting wheels on a fore and aft axis, and supporting devices pivotally sustained by the balance bar on opposite sides of its pivotal axis and adapted to travel on the ground and support the rear portion of said frame.

3. In combination with a frame, provided with wheels supporting the same, a transverse balance bar pivotally connected between its ends thereto on a fore and aft axis, bearing blocks pivotally mounted on the balance bar on opposite sides of its pivotal axis and movable about the axis of the bar, wheel stems mounted in said bearing blocks, and press wheels mounted on said wheel stems, and supporting the rear portion of the frame.

4. In combination with a frame provided with wheels supporting the same, a transverse balance bar pivotally connected between its ends to said frame on a fore and aft axis, bearing blocks carried by said balance bar on opposite sides of its pivotal axis, wheel stems mounted in said blocks, press wheels mounted on said wheel stems and supporting the rear portion of the frame, and devices connecting said bearing blocks with the frame, said devices being jointed at their forward ends to the frame and being connected at their rear ends to the bearing blocks.

5. In combination with a frame provided with wheels supporting the same, a transverse balance bar pivotally connected between its ends thereto on a fore and aft axis, bearing blocks pivotally mounted on the balance bar at opposite sides of its pivotal axis, press wheels carried by the bearing blocks and supporting the rear portion of the frame, and connecting straps between the bearing blocks and frame, said connecting straps being jointed at their forward ends to the frame and being fixed at their rear ends to the bearing blocks.

6. In combination with a frame provided with wheels supporting the same, a transversely extending bearing sleeve rigidly connected with the rear end of said frame and formed with a bearing opening elongated in a vertical direction, a transverse balance bar extending through said sleeve and pivotally mounted therein on a fore and aft axis so that it may rock in said elongated bearing opening, and press wheels carried by said balance bar on opposite sides of its pivotal axis and supporting the rear portion of the frame.

7. In combination with a frame, wheels mounted on the frame and supporting the same, seeding mechanisms supported by the frame for planting two rows, a transverse balance bar pivotally mounted between its ends on the rear of the frame on a fore and aft axis, and press wheels carried by said bar on opposite sides of its pivotal axis in position to track behind the seed planting mechanisms and acting to support the rear portion of the frame.

8. In combination with a frame having rearwardly converging sides, a transverse balance bar pivoted between its ends to the rear end of the frame on a horizontal fore and aft axis, bearing blocks mounted pivotally on said bar on opposite sides of its pivotal axis respectively, press wheels carried by said bearing blocks, and straps connected at their rear ends to the bearing blocks and jointed at their forward ends to the converging sides of the frame.

In testimony whereof, I have affixed my signature in presence of two witnesses.

HARRY S. DICKINSON.

Witnesses:
L. C. BLANDING,
JAMES J. LAMB.